United States Patent [19]
Ohuchida et al.

[11] Patent Number: 5,106,197
[45] Date of Patent: Apr. 21, 1992

[54] LIQUID CRYSTAL DISPLAY APPARATUS

[75] Inventors: Hirofumi Ohuchida; Tsuneo Hamaguchi, both of Amagasaki, Japan

[73] Assignee: Mitsubishi Denki Kabushiki Kaisha, Tokyo, Japan

[21] Appl. No.: 626,822

[22] Filed: Dec. 13, 1990

[30] Foreign Application Priority Data

Dec. 22, 1989 [JP] Japan .................. 1-333923

[51] Int. Cl.$^5$ .................. G02F 1/1333; G02F 1/1343
[52] U.S. Cl. .......................... 359/83; 359/88
[58] Field of Search ............... 350/336, 334; 359/83 (U.S. only), 88 (U.S. only)

[56] References Cited

U.S. PATENT DOCUMENTS

| | | | |
|---|---|---|---|
| 4,408,836 | 10/1983 | Kikuno | 350/334 |
| 4,600,273 | 7/1986 | Ohno | 350/336 |
| 4,832,457 | 3/1989 | Saitoh et al. | 350/334 |
| 4,906,071 | 3/1990 | Takahara et al. | 350/331 R |

FOREIGN PATENT DOCUMENTS

| | | |
|---|---|---|
| 59-22089 | 2/1984 | Japan . |
| 61-236585 | 12/1986 | Japan . |
| 62-111235 | 5/1987 | Japan . |

Primary Examiner—John S. Heyman
Assistant Examiner—Ron Trice
Attorney, Agent, or Firm—Burns, Doane, Swecker & Mathis

[57] ABSTRACT

A liquid crystal display apparatus which realizes a large-scale display by connecting a plurality of liquid crystal panels wherein on an electrode substrate having data bus lines and gate bus lines on one surface are formed extension lines each extending from an end of each of the data bus lines and gate bus lines to the opposite surface of the electrode substrate, and a plurality of the electrode substrates are mounted on a substrate on which electrodes are provided to electrically connect the extension lines of the data bus lines or gate bus lines on one electrode substrate with the corresponding ones on other electrode substrate.

4 Claims, 8 Drawing Sheets

LIQUID CRYSTAL DISPLAY APPARATUS

BACKGROUND OF THE INVENTION

1. Field of the Invention

This invention relates to a liquid crystal display apparatus where a plurality of liquid crystal panels driven by thin film transistors are connected.

2. Description of the Related Art

To realize a large-scale display in a liquid crystal display apparatus, a substrate, a main component of the display, wherein electrodes for pixels are formed on the surface thereof (the substrate being referred to as an electrode substrate hereinafter) is connected to other substrates, since the size of one electrode substrate is restricted to the scale of the manufacturing equipment.

FIGS. 1 and 2 illustrate respectively a cross section showing the structure of a conventional liquid crystal display apparatus with a large-scale display as disclosed in Japanese Patent Application Laid Open No. 61-254977 and a cross section showing the manufacturing method of the apparatus, wherein an electrode substrate is designated by numeral 1. FIG. 3 is a partial wiring diagram of the electrode substrate 1. As is indicated in FIG. 3, switching active trasistors, namely, TFT's (Thin Film Transistor) 4 are arranged on the surface of the electrode substrate 1 so as to drive a liquid crystal at a position corresponding to each pixel. On the surface of the electrode substrate 1, a data bus line 2 is connected to a source of the TFT 4 and a gate bus line 3 orthogonal to the data bus line 2 is connected to a gate of the TFT 4. Referring back to FIGS. 1 and 2, two electrode substrates 1 are bonded by adhesives 5, and the respective data bus lines 2 and gate bus lines 3 are electrically connected with each other by a conductive thin film 6 formed through irradiation of laser beams 11. A counter electrode substrate 7 is provided above the electrode substrate 1 spaced by a spacer 8, with a liquid crystal 9 filled in between the electrode substrate 1 and counter electrode substrate 7. The liquid crystal 9 is prevented from leaking by sealing members 10.

A method to constitute a liquid crystal display apparatus with four connected electrode substrates 1 of the above-described structure will be discussed hereinafter. In the first place, four electrode substrates 1 are brought in touch with each other in a manner such that each electrode substrate 1 is in contact with the other substrates 1 on two sides. Then, the adhesives 5 are filled into the contacting parts of the electrode substrates 1 to connect the four electrode substrates 1. The bonded electrode substrate 1 is put in a reaction container containing a photo-reactive gas. Laser beams 11 are sequentially irradiated to the connecting points of the data bus lines 2 and gate bus lines 3, thereby forming the conductive thin films 6, respectively, to electrically connect the electrode substrates 1. Thereafter, the counter electrode substrate 7 is layered on the bonded electrode substrate 1 with a spacer 8 therebetween, and the liquid crystal 9 is filled in between the electrode substrates 1 and counter electrode substrate 7. The liquid crystal 9 is sealed by the sealing members 10. As a result, a liquid crystal display apparatus consisting of the four electrode substrates is obtained.

Although the foregoing description is directed to the liquid crystal display apparatus with four electrode substrates, a larger-scale display can be realized if more electrode substrates are connected in the above-described fashion.

However, since it is required to electrically connect the data bus lines and gate bus lines of the adjacent electrode substrates one by one in the conventional liquid crystal display apparatus, the problem of low productivity remains to be solved.

SUMMARY OF THE INVENTION

Accordingly, this invention has been devised to solve the aforementioned disadvantage inherent in the conventional liquid crystal display apparatus.

A first object of this invention is to provide a liquid crystal display apparatus allowing a large-scale display to be easily realized.

A second object of this invention is to provide a method of manufacturing a liquid crystal display apparatus with high productivity, whereby a large-scale display can be easily realized.

The above and further objects and features of the invention will more fully be apparent from the following detailed description with accompanying drawings.

DESCRIPTION OF THE PREFERRED EMBODIMENTS

A liquid crystal display apparatus and its manufacturing method will be discussed in detail hereinafter with reference to the accompanying drawings.

Figure 1:
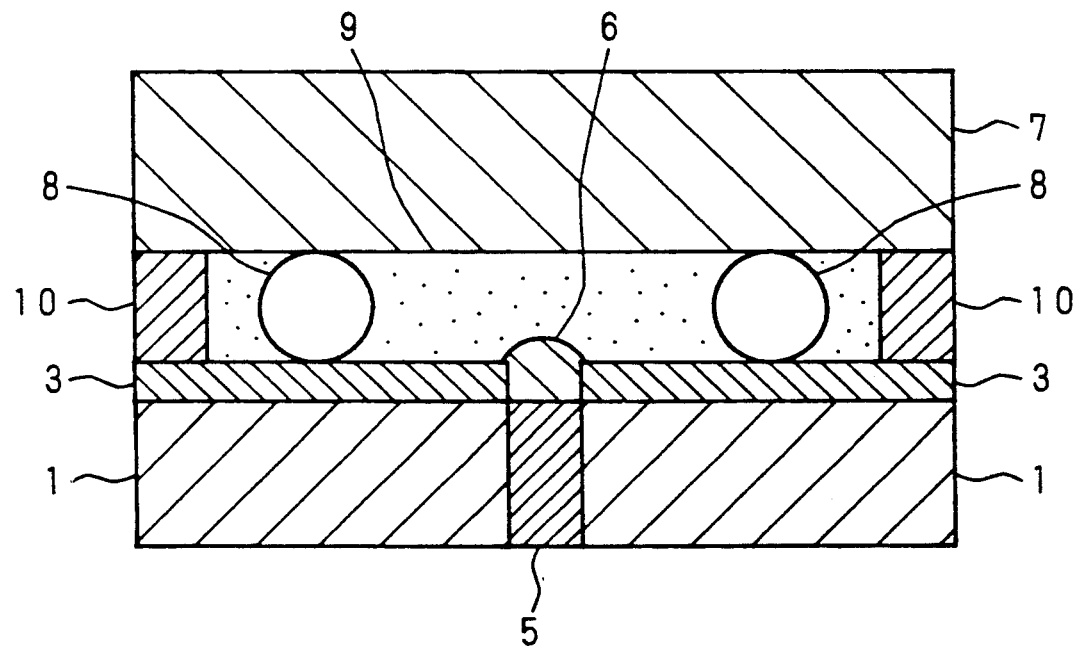
FIG. 1 is a cross section showing the structure of a conventional liquid crystal display apparatus.
Figure 2:
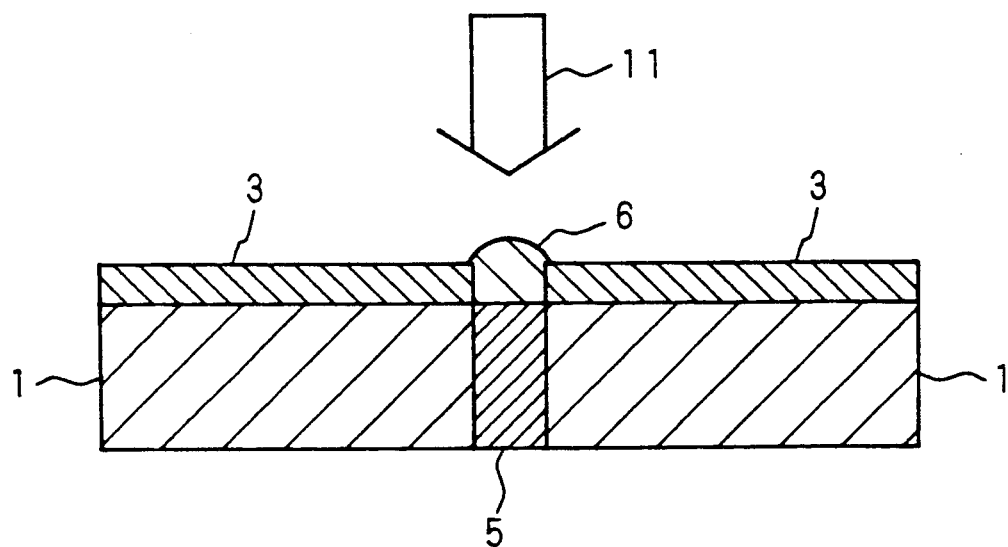
FIG. 2 is a cross section showing a manufacturing method of a conventional liquid crystal display apparatus.
Figure 3:
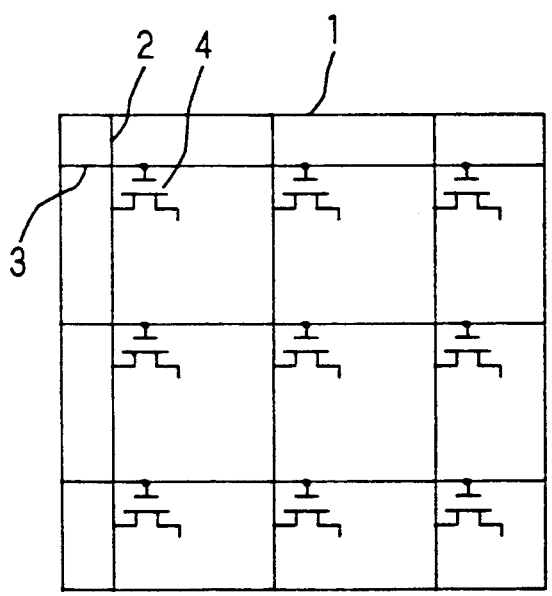
FIG. 3 is a partial wiring diagram of an electrode substrate.
Figure 4:
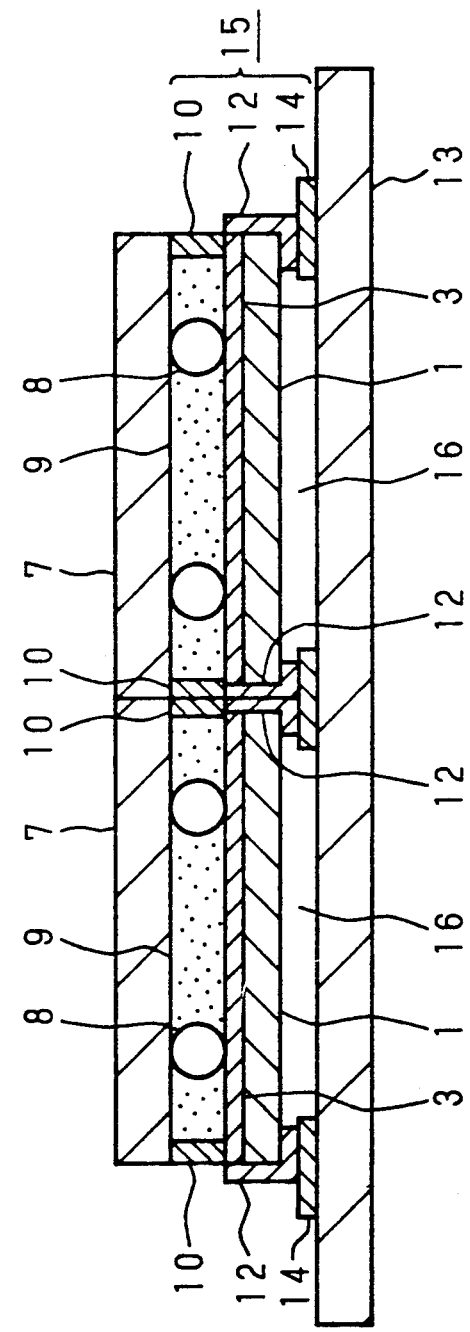
FIG. 4 is a cross section showing the structure of a liquid crystal display apparatus according to one embodiment of this invention.

Referring to FIG. 4, numeral 1 designates an electrode substrate. On the surface of the electrode substrate 1 is formed TFT's 4 as switching active transistors for driving each liquid crystal at a position corresponding to each pixel, as is shown in FIG. 3, with a data bus line 2 being connected to a source of the TFT 4 and a gate bus line 3 orthogonal to the data bus line 2 being connected to a gate of the TFT 4. A lead-out electrode 12 is provided at both ends of each of the data bus lines 2 and gate bus lines 3, extending from the lateral face to an end part at the reverse face of the electrode substrate 1. According to this embodiment, the gate bus lines 3 and lead-out electrodes 12 will be mainly explained below. Above the electrode substrate 1 is provided a counter electrode substrate 7 with spacers 8 therebetween. A liquid crystal 9 is filled in between the electrode substrate 1 and counter electrode substrate 7. Sealing members 10 prevent the liquid crystal 9 from leaking. One sheet of the electrode substrate 1 equipped with the lead-out electrodes 12, spacers 8, liquid crystal 9, sealing members 10 and counter electrode substrate 7 constitutes one unit of a liquid crystal panel 15.

Figure 5:
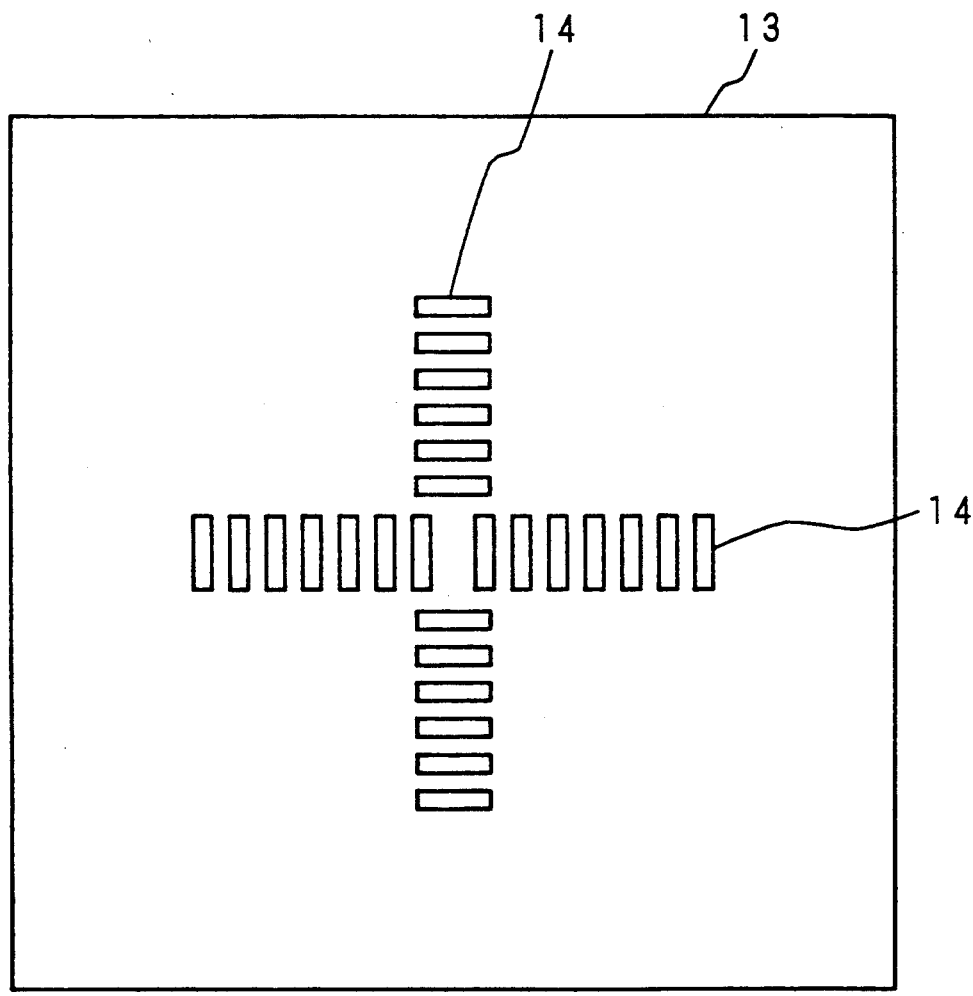
FIG. 5 is a plan of a supporting substrate related to the liquid crystal display apparatus of this invention.

FIG. 5 shows a plan of a supporting substrate 13 on which four units of the liquid crystal panels 15 are mounted. According to this embodiment, every electrode substrate 1 has seven gate bus lines 3 arranged in a longitudinal direction of the supporting substrate 13 and six data bus lines 2 in a lateral direction of the substrate 13. A plurality of electrodes 14 longer in the direction of the data bus lines 2 or gate bus lines 3 are aligned on the surface of the supporting substrate 13 at the same distance as the data bus lines 2 or gate bus lines 3. A deposited film of gold is used for the lead-out electrodes 12 and electrodes 14.

A method of manufacturing the liquid crystal display apparatus of this invention will be explained with reference to FIG. 6. Although FIG. 6 depicts a cross section of the gate bus lines 3, a cross section of the data bus lines 2 is the same. A mask is set on the electrode substrate 1, where the data bus lines 2 and gate bus lines 3 are preliminarily formed, to pattern the lead-out electrodes 12 from both respective ends of the data bus lines 2 and gate bus lines 3 to the reverse face of the electrode substrate 1. Then, gold is deposited, thereby to form the lead-out electrodes 12 for the data bus lines 2 and gate bus lines 3 (FIG. 6(a)). Meanwhile, a mask for forming the electrodes 14 on the surface of the supporting substrate 13 is set on the supporting substrate 13. Thereafter, gold is deposited, thereby to form the electrodes 14 spaced at the same distance as the data bus lines 2 or gate bus lines 3 (FIG. 6(b)).

Figure 6A:
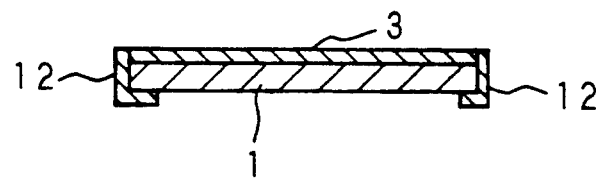
FIG. 6 (a-e) is a cross section showing a manufacturing method of the liquid crystal display apparatus according to one embodiment of this invention.
Figure 6B:
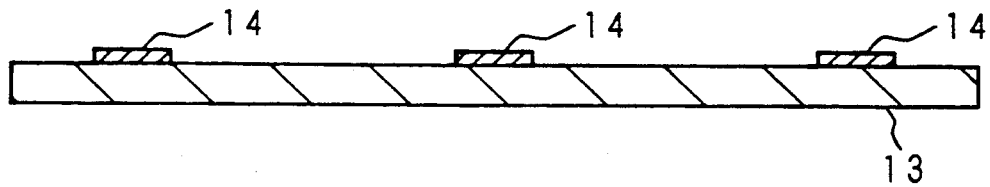
Figure 6C:
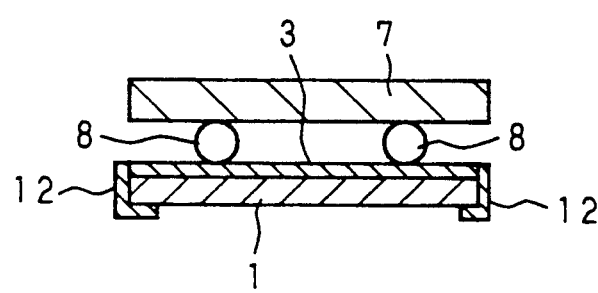
Figure 6D:
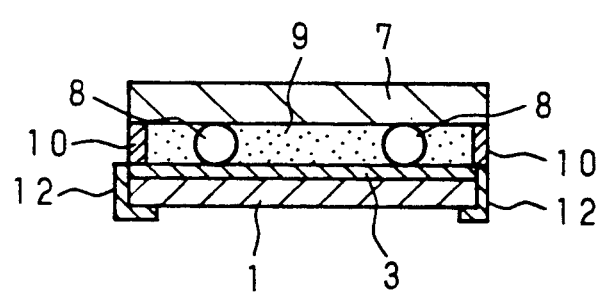
Figure 6E:
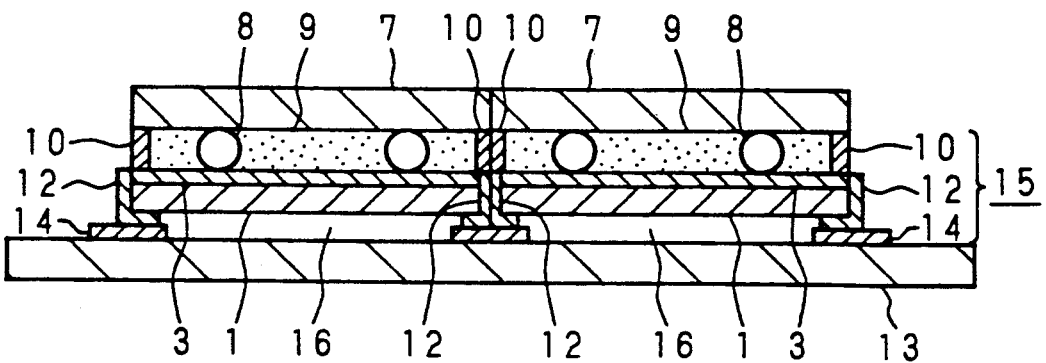

The counter electrode substrate 7 is layered on the electrode substrate 1 where the lead-out electrodes are formed, with the spacers 8 therebetween (FIG. 6(c)). After the liquid crystal 9 is filled in between the electrode substrate 1 and counter electrode substrate 7, the liquid crystal is sealed by the sealing members 10. Four units of the liquid crystal panels 15 assembled through the above-mentioned processes are prepared (FIG. 6(d)). Each liquid crystal panel is mounted on the supporting substrate so as to connect the lead-out electrodes 12 at one side of each unit of the liquid crystal panel 15 with the electrodes 14 and fix them by adhesives 16 or the like. The lead-out electrodes 12 at the other adjacent side of each unit are connected with the electrodes 14 in the same manner. Moreover, the lead-out electrodes 12 of the respective remaining three units are also arranged in touch with the electrodes 14. As a result, the lead-out electrodes 12 of the data bus lines 2 and gate bus lines 3 on one electrode substrate are electrically connected with respective ones on other electrode substrates 1. The adjacent liquid crystal panels 15 are tightly secured by adhesives or the like, resulting in a large-scale display screen four times as large as one unit of the liquid crystal panel 15 (FIG. 6(e)).

Figure 7A:
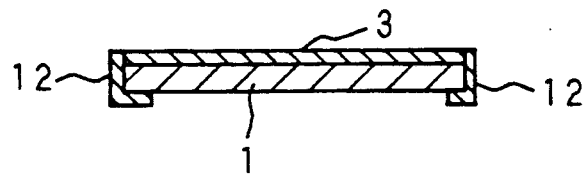
FIG. 7 (a-d) is a cross section showing a manufacturing method of the liquid crystal display apparatus according to another embodiment of this invention.
Figure 7B:
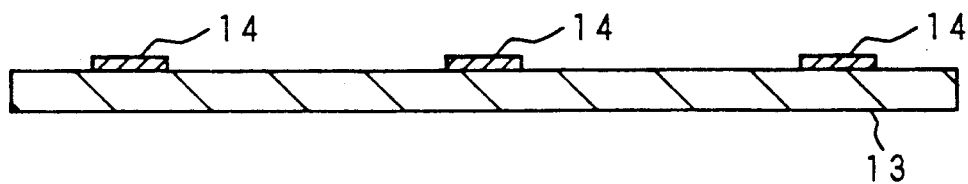
Figure 7C:
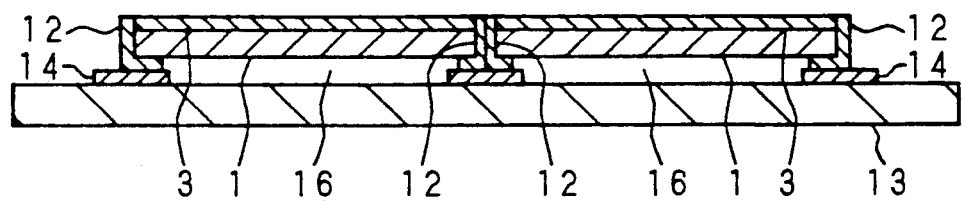
Figure 7D:
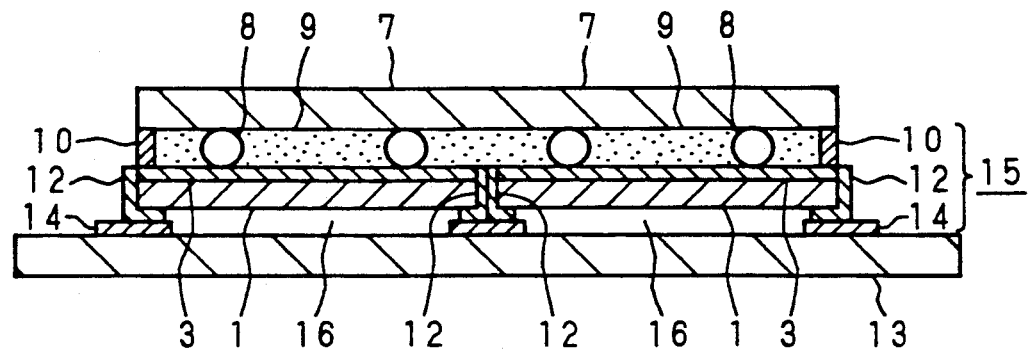

Another manufacturing method of the liquid crystal display apparatus will be discussed referring to FIG. 7. Description on steps of FIGS. 7(a) and 7(b) is omitted here, since it is the same as the preceding embodiment. A plurality of electrode substrates 1, where the data bus lines 2, gate bus lines 3 and lead-out electrodes 12 are formed, are set on the supporting substrate 13. The data bus lines 2 and gate bus lines 3 of the adjacent electrode substrates 1 are electrically connected with each other via the electrodes 14 (FIG. 7(c)). Then, the counter electrode substrate 7 is layered on the electrode substrates 1 with spacers 8 therebetween and, the liquid crystal 9 is filled in between the electrode substrates 1 and counter electrode substrate 7 and sealed the liquid crystal 9 by the sealing members 10 (FIG. 7(d)).

Figure 8:
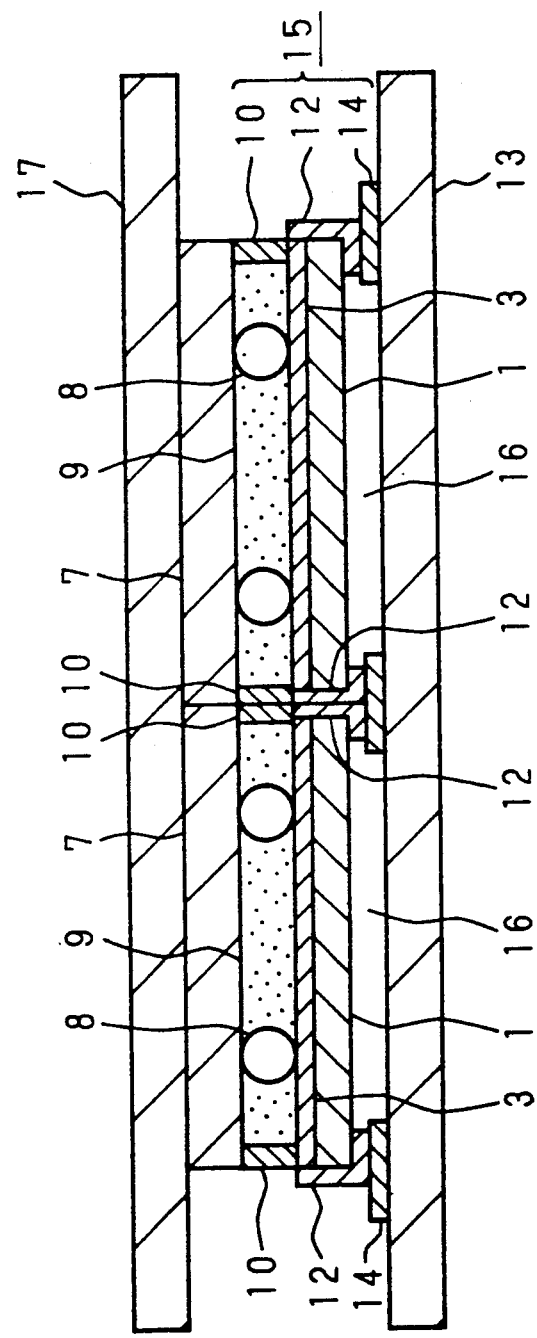
FIG. 8 is a cross section showing the structure of a liquid crystal display apparatus according to another embodiment of this invention.

FIG. 8 shows a cross section of a liquid crystal display apparatus according to a different embodiment of this invention, in which another supporting substrate 17 is provided on the opposite side of the supporting substrate 13. In other words, the liquid crystal display apparatus of this embodiment is so constituted that the liquid crystal panels 15 are sandwiched between the two large supporting substrates, and accordingly the apparatus is stronger.

It is to be noted here that although the lead-out electrodes 12 and electrodes 14 are formed through deposition of gold according to the foregoing embodiments, such metal or metallic compound as Cr, ITO (Indium Tin Oxide), etc. can be used in place of gold. Moreover, sputtering, plating, CVD (Chemical Vapour Deposition) or the like method may be employed.

In the foregoing embodiments, four electrode substrates 1 are arranged, but if the number of electrodes 14 and electrode substrates 1 on the supporting substrate 13 is increased, a liquid crystal display apparatus having a much larger-scale display can be obtained.

Further, although the lead-out electrodes 12 are formed at both ends of each of the data bus lines 2 and gate bus lines 3, it is possible not to form the lead-out electrode 12 except where the data bus lines 2 and gate bus lines 3 are required to be electrically connected.

Moreover, the electrode 14 on the supporting substrate 13 electrically connects the two lead-out electrodes 12 of the adjacent liquid crystal panels 15 in the foregoing embodiments, but may connect three or more electrodes 12. In such case, the length of the electrode 14 should be determined suitably.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A liquid crystal display apparatus comprising:
   a plurality of electrode substrates, each electrode substrate having data bus lines and gate bus lines on one surface of two opposite surfaces thereof, with extension lines each extending from an end of each of said data bus lines and said gate bus lines to the surface thereof opposite to said one surface; and
   a substrate on which said plurality of electrode substrates are mounted, having electrodes at positions each corresponding to said extension lines on said surface opposite to said one surface of each electrode substrate so that said data bus lines or said gate bus lines on an electrode substrate are electrically connected with corresponding data bus lines or corresponding gate buses lines on an adjacent electrode substrate.

2. A liquid crystal display apparatus as set forth in claim 1, further comprising a reinforcing substrate provided across said plurality of electrode substrates opposing said substrate.

3. A method of manufacturing a liquid crystal display apparatus comprising:
- a step of forming data bus lines and gate bus lines to cross each other on one surface of two opposite surfaces of an electrode substrate, and extension lines each extending from an end of each of said data bus lines and gate bus lines to the surface opposite to said one surface of said electrode substrate;
- a step of providing a counter electrode substrate on said electrode substrate with spacers between said counter electrode substrate and said electrode substrate;
- a step of filling a liquid crystal in between said electrode substrate and said counter electrode substrate, sealing said liquid crystal therebetween thereby to assemble one unit of a liquid crystal panel;
- a step of forming electrodes on a supporting substrate at positions each corresponding to said extension lines on said surface opposite to said one surface of said electrode substrate; and
- a step of placing a plurality of said units of liquid crystal panels on said supporting substrate in a manner that said extension lines on said surface opposite to said one surface of said electrode substrate are in contact with said electrodes.

4. A method of manufacturing a liquid crystal display apparatus comprising:
- a step of providing a plurality of electrode substrates which are identical;
- a step of forming data bus lines and gate bus lines to cross each other on one surface of two opposite surfaces of each of said plurality of electrode substrates, and extension lines each extending from an end of each of said data bus lines and said gate bus lines to the surface opposite to said one surface of each of said plurality of electrode substrates;
- a step of forming electrodes on a supporting substrate at positions each corresponding to said extension lines on said surface opposite to said one surface of each of said electrode substrates;
- a step of placing said plurality of electrode substrates, supporting substrate in a manner that said extension lines are in contact with said electrodes;
- a step of providing a counter electrode substrate on said plurality of electrode substrates with spacers between said counter electrode substrate and said plurality of electrode substrates; and
- a step of filling a liquid crystal in between said plurality of electrode substrates and said counter electrode substrate and sealing said liquid crystal therebetween.

* * * * *